Figure 1:
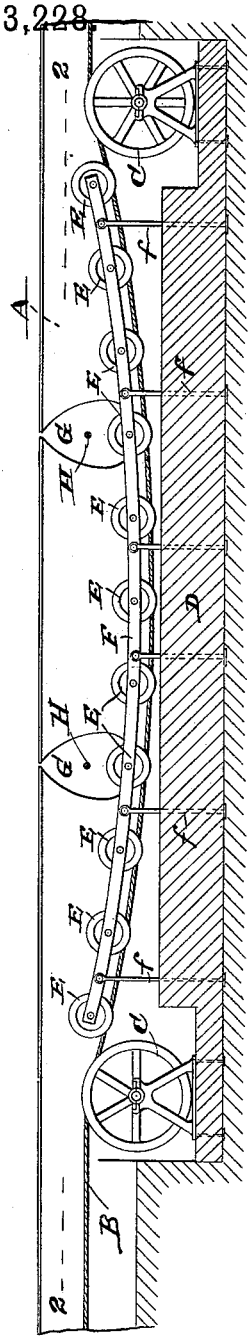

(No Model.)

H. C. GRAWE.
CABLE CROSSING DEVICE FOR RAILROAD AND OTHER POWER TRANSMITTING PURPOSES.

No. 393,228. Patented Nov. 20, 1888.

Attest:
N. W. Perkins, Jr.
Charles Pickles.

Inventor:
Herman C. Grawe,
by C. D. Moody, atty.

UNITED STATES PATENT OFFICE.

HERMAN C. GRAWE, OF ST. LOUIS, MISSOURI.

CABLE-CROSSING DEVICE FOR RAILROAD AND OTHER POWER-TRANSMITTING PURPOSES.

SPECIFICATION forming part of Letters Patent No. 393,228, dated November 20, 1888.

Application filed April 23, 1888. Serial No. 271,529. (No model.)

*To all whom it may concern:*

Be it known that I, HERMAN C. GRAWE, of the city of St. Louis, State of Missouri, have made a new and useful Improvement in Cable-Crossing Devices for Railroad and other Power-Transmitting Purposes, of which the following is a specification.

Said improvement relates especially to the construction employed at a crossing of one cable railroad by another cable railroad, and is applicable generally to crossings of cables employed for transmitting power for any purposes, whether said cables are placed underground, above-ground, or overhead, and whether they or either of them travel in a horizontal, vertical, or any intermediate direction.

By devices hitherto employed in the above-mentioned constructions one of said crossing cables has been made to form an angular bend or bends in its course. The abruptness and frequency of said bends in the cable produces a tendency of the wires composing the cable to break, thereby weakening it, causes an increase in the friction and strain imposed on the cable, thereby increasing its liability to break and diminishing its lasting properties, and necessitates an increase of power requisite to move said cable.

The object of the herein-described improvement is to obviate the difficulties referred to and provide an improved means whereby a cable can be carried across another cable for cable-railroad purposes or for transmitting power for any other purposes. The said improvement is carried out by providing means whereby the said crossing cable is subjected to a fewer number of bends, and which are more gradual than is the case under the usual mode of construction, as hereinbefore described.

My said improvement in the application of it to cable-railroad crossings consists of a series of vertical pulleys, under and in the grooves of which said underrunning cable travels, said series of pulleys being placed so that the line of their lower edges, which rest upon said cable, describes a gradual curve, and which being made to bear down upon said cable gradually swerves it from its original straight course into that of a gentle curve, whereby it passes the upper cable at a sufficient distance below it, and then gradually curves back to a point on a line with its original straight course. A vertical pulley is placed at each end of said curve in said cable, over which pulleys said cable travels, and is held in place thereby, substantially as hereinafter more fully set forth and claimed, and as illustrated in the annexed drawings, making part of this specification, in which—

Figure 2:
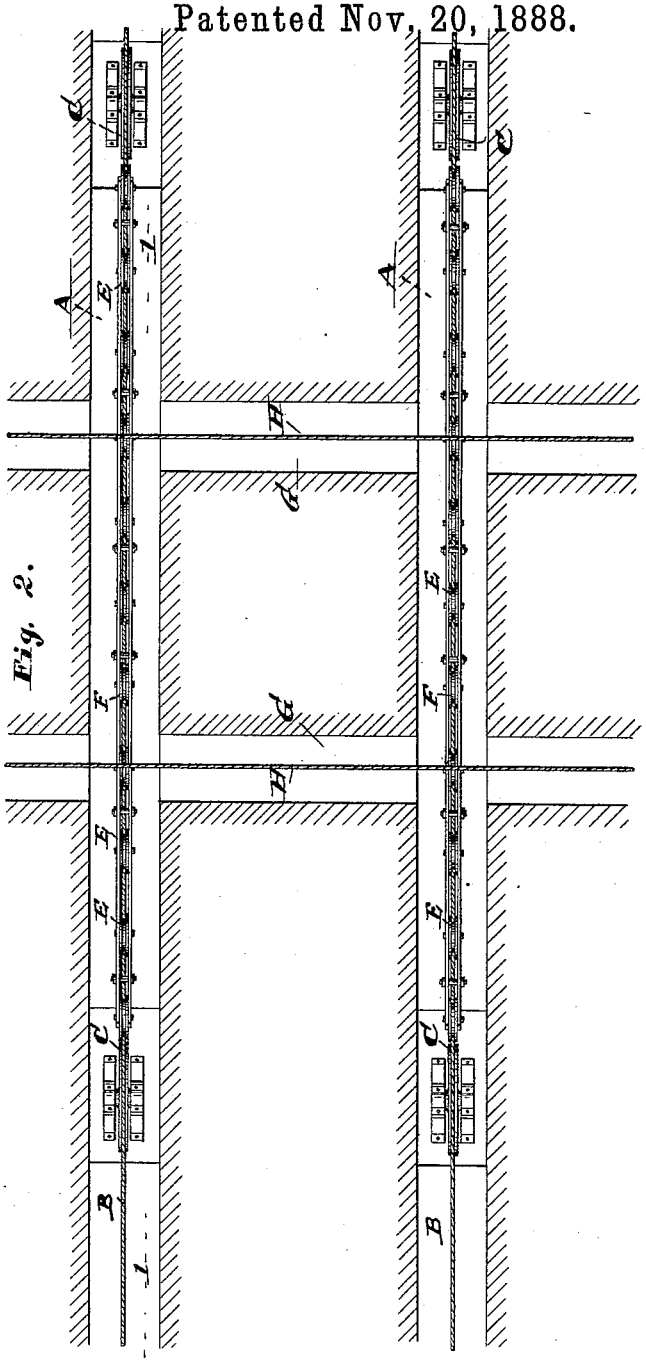

Figure 1 is a vertical longitudinal section of a cable-railroad crossing on the line 1 1 of Fig. 2, and Fig. 2 a horizontal section of the same on the line 2 2 of Fig. 1.

In said drawings a double-track railroad is represented. The rails of the railroad are not shown in the drawings, their appearance therein not being necessary to the understanding of the said improvement.

Similar letters on the different drawings denote the same parts.

A represents the cable conduits or tunnels of a cable railroad, in which are placed the herein-described improvements; B, the underrunning cables; C, fixed pulleys on which the cable B runs at the starting-points of the curve; D, anchor, foundation, or bed-plate of the structure, and which may be constructed wholly or in part of timber, iron, or masonry; E, pulleys of the curved series bearing upon the cable B; F, frame which forms the bearings of the axles of pulleys E of the series; *f*, rods anchoring and supporting frame F; G, conduits or tunnels of a crossing cable railroad, the cables of which overrun the cables B; H, cables of same.

In practice the cable B at each end of the curve bears and runs on the fixed pulley C, which causes the said cables to maintain a straight line to those points. Said cable runs under the curved series of pulleys E, which, being held firmly in their places, depress the said cable in a gentle and easy curve a sufficient distance below the overcrossing cable G, thereby doing away with the usual abrupt bends in the cables.

The herein-described improvement is applicable to crossings of cables transmitting power for any purposes, whether underground or above-ground or overhead.

An inversion of the drawing Fig. 1 illustrates the mode of applying the improvement to overhead cables, in which case the cables are caused to curve upward instead of downward, as in the underground case. The frame for holding said series of pulleys in the position described, instead of being a continuous one, may be in sections.

I claim—

1. In a cable-railroad crossing, a series of vertical pulleys, E, under and in the grooves of which the underrunning cable B of said crossing travels, the line of the lower edge of the pulleys composing said series, and which bear upon said cable, being made to describe a gentle curve bending downward and returning, causing said cable to conform thereto in its course, and to thereby travel in a continuous gentle curve reaching from tangent to tangent of the course of said cable, in the course of which curve it is gradually deflected from its straight course a sufficient distance from the other cable, H, which it crosses, substantially as described.

2. In a cable-crossing, a series of pulleys, under and in the grooves of which the underrunning cable of said crossing travels, the line of the lower edge of the pulleys composing said series, and which bear upon said cable, being made to describe a gentle curve bending downward and returning, causing said cable to conform thereto in its course, and to thereby travel in a continuous gentle curve reaching from tangent to tangent of the course of said cable, in the course of which curve it is gradually deflected from its straight course a sufficient distance from the other cable, which it crosses, substantially as described.

3. A device for the crossing of cables used for cable railroads and other power-transmitting purposes, consisting of a series of pulleys, all revolving in the same plane and consecutively placed, with the line of their edges which point respectively in the same direction describing a gentle convex curve, which curved series of edges of pulleys is made to bear lengthwise against a cable which crosses another, causing the cable to which application is made to conform to the curved series of pulley-edges above described and form a continuous gentle curve extending from tangent to tangent of the direction of said cable, in the course of which curve it is gradually deflected from its straight course a sufficient distance from the other cable, which it crosses, substantially as described.

4. The herein-described cable-crossing device, consisting of the following combination: the curved series of pulleys E, frame F, rods $f$, and pulleys C, substantially as described.

HERMAN C. GRAWE.

Witnesses:
C. D. MOODY,
C. C. LOGAN.